United States Patent
Mendez et al.

(10) Patent No.: US 12,468,108 B2
(45) Date of Patent: Nov. 11, 2025

(54) DUAL TAIL SHAPE COMPENSATION FILTER IN SUBMARINE CABLE JOINT

(71) Applicant: SUBCOM, LLC, Eatontown, NJ (US)

(72) Inventors: Jeremiah A. Mendez, Bayville, NJ (US); John A. Towne, Milton Mills, NH (US); Michael Boundy, Dover, NH (US); Marsha Ann Spalding, Hampton, NJ (US); Andrew D. Meigs, Durham, CT (US); Francisco J. Natividad, East Brunswick, NJ (US)

(73) Assignee: SubCom, LLC, Eatontown, NJ (US)

(*) Notice: Subject to any disclaimer, the term of this patent is extended or adjusted under 35 U.S.C. 154(b) by 287 days.

(21) Appl. No.: 18/215,047

(22) Filed: Jun. 27, 2023

(65) Prior Publication Data

US 2024/0004158 A1    Jan. 4, 2024

Related U.S. Application Data

(60) Provisional application No. 63/357,226, filed on Jun. 30, 2022.

(51) Int. Cl.
*G02B 6/44* (2006.01)

(52) U.S. Cl.
CPC .................. *G02B 6/4471* (2013.01)

(58) Field of Classification Search
CPC ..................................... G02B 6/4471
See application file for complete search history.

(56) References Cited

U.S. PATENT DOCUMENTS

| 2002/0048445 A1 | 4/2002 | Kordahi |
| 2005/0185257 A1 | 8/2005 | Young |

FOREIGN PATENT DOCUMENTS

| DE | 10357917 A1 | 4/2005 |
| EP | 0057828 A1 | 8/1982 |
| EP | 1356325 B1 | 5/2005 |
| JP | 2005215413 A * | 8/2005 |

OTHER PUBLICATIONS

English translation of JP2005215413A (Year: 2005).*
European Search Report for EP Application No. 23182352.7, dated Feb. 19, 2024, 9 pages.

* cited by examiner

*Primary Examiner* — Sung H Pak
(74) *Attorney, Agent, or Firm* — KDW Firm PLLC

(57) ABSTRACT

Disclosed herein are undersea optical cable connection assemblies and systems. In some embodiments, a retainer is operable to arrange a plurality of SCFs and a plurality of microsplints, the retainer including a main body having a first section and a second section. The retainer may further include a first channel and a second channel extending through the first section, wherein a first set of SCFs extend through the first channel, and wherein a second set of SCFs extend through the second channel. The retainer may further include a third channel and a fourth channel extending through the first section, wherein a first set of microsplints extends through the third channel, and wherein a second set of microsplints extends through the fourth channel. A third set of microsplints extends through the third channel, wherein the first and third sets of microsplints are separated from one another by a padding layer.

21 Claims, 10 Drawing Sheets

DUAL TAIL SHAPE COMPENSATION FILTER IN SUBMARINE CABLE JOINT

CROSS-REFERENCE TO RELATED APPLICATION

This application claims priority to U.S. provisional patent application Ser. No. 63/357,226, filed on Jun. 30, 2022, entitled "Dual Tail Shape Compensation Filter in Submarine Cable Joint," which is incorporated herein by reference in its entirety.

FIELD OF THE DISCLOSURE

The present disclosure relates generally to the retention and protection of optical fibers and, more specifically, to an arcuate retainer for organizing and securing optical fibers.

BACKGROUND OF THE DISCLOSURE

Optical fibers may be used as transmission paths for optical signals in communications networks. Such optical fibers often must extend across many miles and large bodies of water. To protect the optical fibers, particularly in an undersea or submarine environment, the optical fibers may be included in an optical cable that provides many layers of protection. An undersea or submarine optical cable may include, for example, layers of strength members, tubing, a conductor, insulation, shielding, and sheaths depending upon the system environmental conditions.

Traditionally, undersea optical systems are constructed by integrating multiple cable lengths in series, including periodic insertion of undersea amplifiers. When several amplifiers have been integrated, over hundreds of kilometers, this segment or block is tested. The shape of the optical transmission signal is affected by passing through the amplifiers in this block. As a result, the shape compensations filters are inserted periodically at the end of each block to adjust the shape of the optical transmission, prior to the next block.

In the recent past, fiber counts in undersea optical systems have allowed the use of one single shape compensation filter housed in one protective package, per optical fiber path. This approach has been successful in storing all shape compensation filters and associated tail splices in one undersea cable-to-cable joint for fiber counts up to 32 fibers, utilizing standard undersea joint hardware. These joints are typically identified as an "equalization joint" or "shape joint".

For fiber counts above 32 fibers, however, storage capacity of shape compensation filters and associated 64 tail splices in an undersea cable-to-cable joint is exceeded. One prior solution considered for fiber counts above 32 fibers requires using two, in line, cascaded undersea cable-to-cable joints to store sufficient shape compensations. However, the additional cost of the extra undersea cable joint and logistics in handling two adjacent undersea cable joint make this solution unattractive.

It is with respect to this and other deficiencies of existing solutions that the present disclosure is provided.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

In one aspect, an undersea optical cable connection assembly may include a plurality of shape compensation filters (SCF) and a plurality of microsplints, and a retainer operable to arrange the plurality of SCFs and the plurality of microsplints. The retainer may include a main body including a first section and a second section, and a first channel and a second channel extending through the first section of the main body, wherein a first set of SCFs of the plurality of SCFs extend through the first channel, and wherein a second set of SCFs of the plurality of SCFs extend through the second channel. The retainer may further include a third channel and a fourth channel extending through the first section of the main body, wherein a first set of microsplints of the plurality of microsplints extends through the third channel, and wherein a second set of microsplints of the plurality of microsplints extends through the fourth channel. The retainer may further include a third set of microsplints of the plurality of microsplints extending through the third channel, wherein the first and third sets of microsplints are separated from one another by a first padding layer.

In another aspect, a submarine cable joint may include a plurality of shape compensation filters (SCF) and a plurality of microsplints, and a retainer operable to arrange the plurality of SCFs and the plurality of microsplints. The retainer may include a main body including a first section and a second section, wherein the first and second sections are located on opposites sides of a central axis, and a first channel and a second channel extending through the first section of the main body, wherein a first set of SCFs of the plurality of SCFs extend through the first channel, and wherein a second set of SCFs of the plurality of SCFs extend through the second channel. The retainer may further include a third channel and a fourth channel extending through the first section of the main body, wherein a first set of microsplints of the plurality of microsplints extends through the third channel, and wherein a second set of microsplints of the plurality of microsplints extends through the fourth channel. The retainer may further include a third set of microsplints of the plurality of microsplints extending through the third channel, wherein the first and third sets of microsplints are separated from one another by a first padding layer.

In yet another aspect, a retainer operable to arrange a plurality of shape compensation filters (SCFs) and a plurality of microsplints may include a main body including a first section and a second section, wherein the first and second sections are located on opposites sides of a central axis, and a first channel and a second channel extending through the first section of the main body. A first set of SCFs of the plurality of SCFs may extend through the first channel, and a second set of SCFs of the plurality of SCFs may extend through the second channel. A third channel and a fourth channel may extend through the first section of the main body, wherein a first set of microsplints of the plurality of microsplints extends through the third channel, and wherein a second set of microsplints of the plurality of microsplints extends through the fourth channel. The retainer may further include a third set of microsplints of the plurality of microsplints extending through the third channel, wherein the first and third sets of microsplints are separated from one another by a first padding layer.

BRIEF DESCRIPTION OF THE DRAWINGS

The accompanying drawings illustrate exemplary approaches of the disclosure, including the practical application of the principles thereof, as follows.

Figure 1:
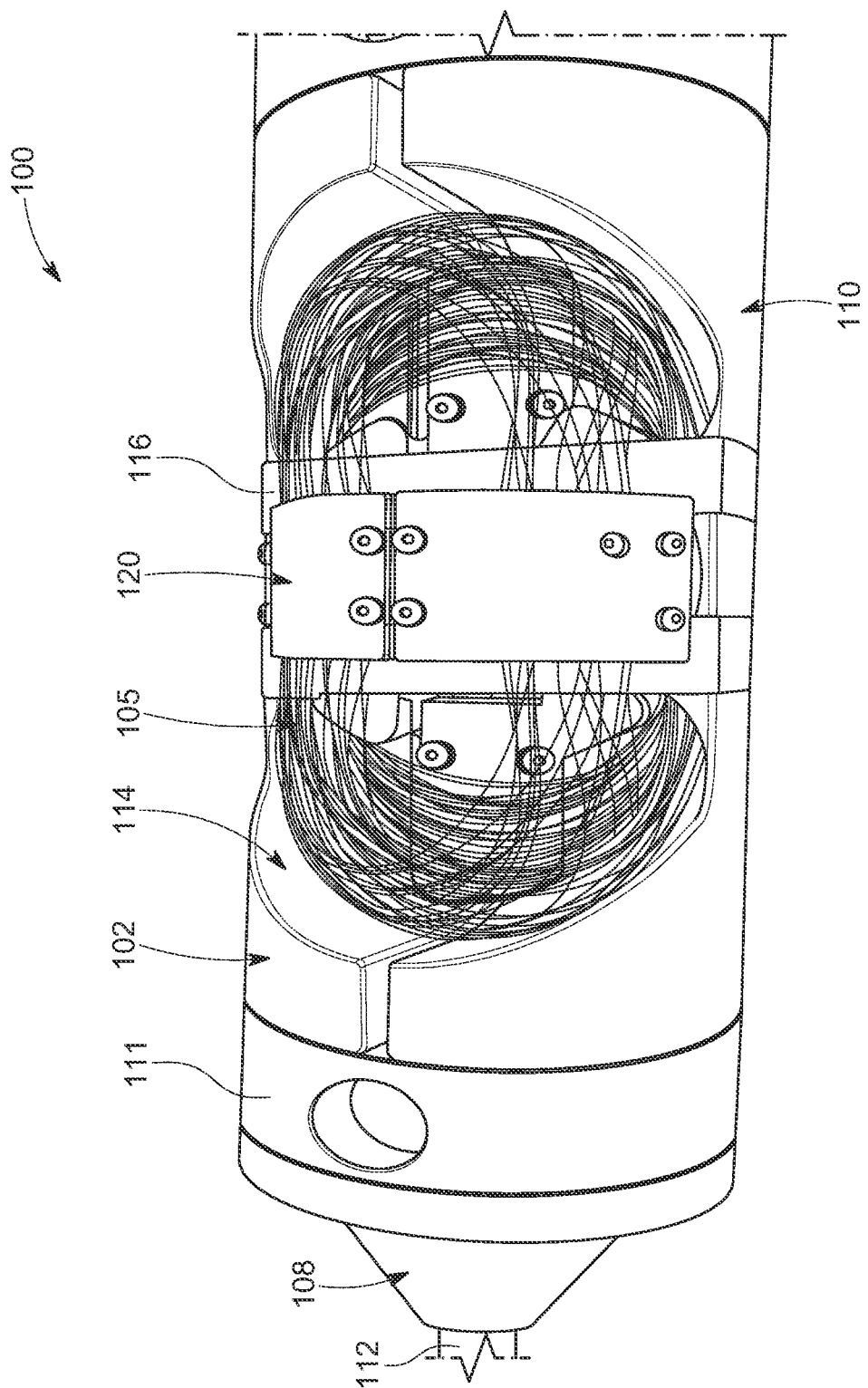
FIGS. 1-2 are perspective views of an assembly according to embodiments of the present disclosure.

The drawings are not necessarily to scale. The drawings are merely representations, not intended to portray specific parameters of the disclosure. The drawings are intended to depict exemplary embodiments of the disclosure, and therefore are not be considered as limiting in scope. In the drawings, like numbering represents like elements.

Furthermore, certain elements in some of the figures may be omitted, or illustrated not-to-scale, for illustrative clarity. The cross-sectional views may be in the form of "slices", or "near-sighted" cross-sectional views, omitting certain background lines otherwise visible in a "true" cross-sectional view, for illustrative clarity. Furthermore, for clarity, some reference numbers may be omitted in certain drawings.

DETAILED DESCRIPTION

Methods, devices, systems, and apparatuses in accordance with the present disclosure will now be described more fully hereinafter with reference to the accompanying drawings, where various embodiments are shown. The methods devices, systems, and apparatuses may be embodied in many different forms and are not to be construed as being limited to the embodiments set forth herein. Instead, these embodiments are provided so the disclosure will be thorough and complete, and will fully convey the scope of the methods to those skilled in the art.

Embodiments described herein advantageously improve existing shape compensation joints using a dual shape compensation filter contained within one protective housing. As a result, packing density of the protective housing is reduced, while increasing the compensation filter capability in one shape joint.

Furthermore, utilization of a "micro" fiber optic splice splint, which is approximately half the size of a traditional fiber optic splice splint, increases the shape compensation filter tail splice storage capacity in a single shape joint. Two micro splints, combined with the use of an elastomeric pad in between, allows for double stacking optical fiber splints.

Figure 2:
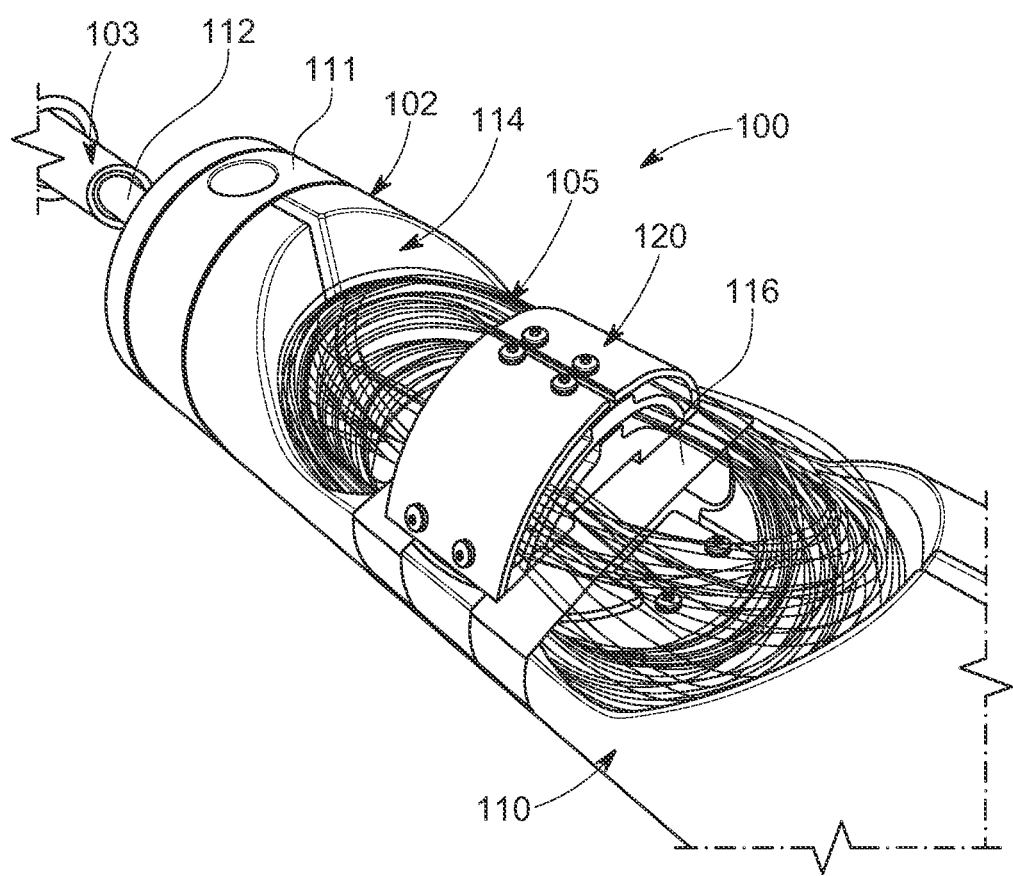

Turning now to FIGS. 1-2, an undersea optical cable connection assembly (hereinafter "assembly") 100 according to embodiments of the present disclosure will be described. As shown, the assembly 100 may include a housing 102 (sometimes referred to as a joint box) for connecting free ends of two cables 103 together. The housing 102 may contain a plurality of optical fibers 105, which are part of an extensive fiber optical communications network that may extend long distances, e.g., in or below a large body of water. As will be described in greater detail herein, the plurality of optical fibers 105 may include a plurality of shape compensation filters (SCF) and a plurality of microsplints arranged within the housing 102.

In some embodiments, the assembly 100 includes cable termination sections 108 at each longitudinal end, and a center section 110 disposed between. Each cable termination section 108 may include a body 111 with a cone-shaped hollow cavity therein, and a cone-shaped plug and sleeve configuration that fits within the hollow cavity. High strength steel wires 112 of the cables 103 are clamped between the hollow cavity of the body 111 and the plug and sleeve, and the outer surface of the sleeve is malleable, which deforms around the high strength steel wire 112 as the plug is inserted. In some embodiments, the body 111 and the plug and sleeve configuration are hollow along a central axis, which enables the optical fibers 105 to extend unrestrained therethrough.

The center section 110 is disposed between and connected to the cable termination sections 108, and houses and protects the spliced section of the optical fibers 105. The center section 110 may be attached to the cable termination sections 108 by a bayonet-type locking arrangement or any known desirable arrangement. Although not shown, the assembly 100 may include a cover for enclosing an interior 114 containing the optical fibers 105.

In some embodiments, the center section 110 may include a shelf 116 that generally divides the center section 110 into upper and lower compartments or sections, as will be described in greater detail below. In such an arrangement, a retainer 120 can be positioned on the upper and lower sides of the shelf 116. Furthermore, the optical fibers 105 may extend from the retainer 120 along one side (i.e., either the upper or lower) of the shelf 116, loop around within the interior 114, and then re-enter the retainer on an opposite side of the shelf.

Figure 3:
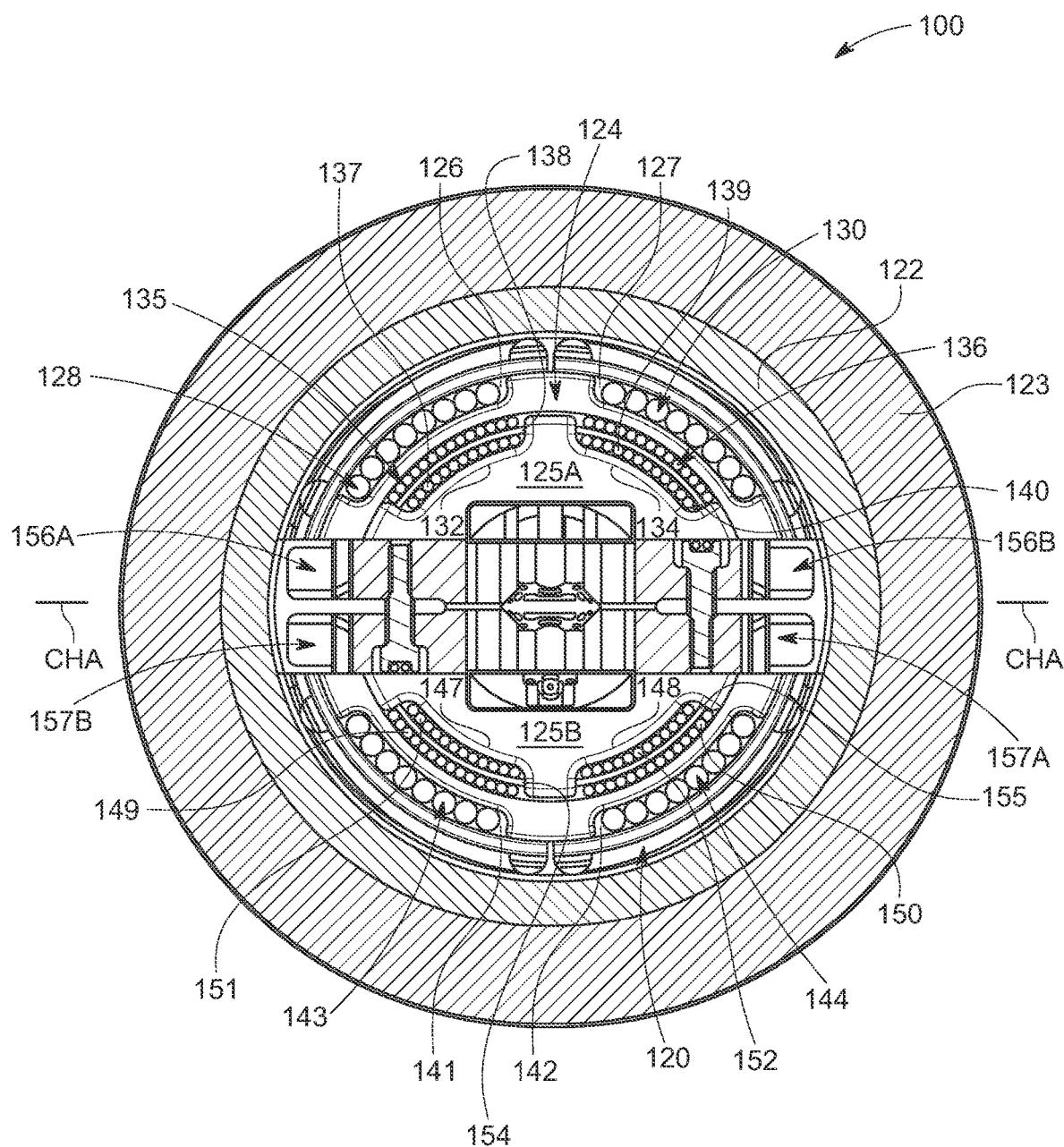
FIG. 3 is a side cross-sectional view illustrating the assembly, according to embodiments of the present disclosure.

Turning now to FIG. 3, a cross-sectional view of the assembly 100 will be described in greater detail. As shown, the assembly 100 may include the retainer 120 enclosed by a pressure housing 122 (e.g., steel), which is surrounded by an insulation layer 123. The retainer 120 may include a main body 124 having a first section 125A and a second section 125B. The first and second sections 125A, 125B are generally positioned on opposite sides of a central horizontal axis 'CHA'. The main body 124 may include a first channel 126 and a second channel 127 extending through the first section 125A, wherein a first set of SCFs 128 of a plurality of SCFs extend through the first channel 126, and wherein a second set of SCFs 130 of the plurality of SCFs extend through the second channel 127. A third channel 132 and a fourth channel 134 may extend through the first section 125A, wherein a first set of microsplints 135 of a plurality of microsplints extends through the third channel 132. Furthermore, a second set of microsplints 136 of the plurality of microsplints may extend through the fourth channel 134.

In some embodiments, a third set of microsplints 137 of the plurality of microsplints may also extend through the third channel 132, wherein the first and third sets of microsplints 135, 137 are separated from one another by a first padding layer 138. In some embodiments, the first padding layer 138 may be a foam or elastomeric pad layer. As shown, the first set of microsplints 135 may be positioned radially farther away from a center of the retainer 120 than the third set of microsplints 137. Similarly, a fourth set of microsplints 139 of the plurality of microsplints may extend through the fourth channel 134, wherein the second and fourth sets of microsplints 136, 139 are separated from one another by a second padding layer 140.

The second section 125B of the main body 124 has a similar arrangement to the first section 125A. For example, a fifth channel 141 and a sixth channel 142 may extend through the second section 125B, and a third set of SCFs 143 of the plurality of SCFs extends through the fifth channel 141, while a fourth set of SCFs 144 of the plurality of SCFs extends through the sixth channel 142. As further shown, a seventh channel 147 and an eighth channel 147 may also extend through the second section 125B, wherein a fifth set of microsplints 149 of the plurality of microsplints extends through the seventh channel 147 and a sixth set of microsplints 150 of the plurality of microsplints extends through the eighth channel 148. A seventh set of microsplints 151 may extend through the seventh channel 147, while an eighth set of microsplints 152 may extend through the eighth channel 148. The fifth and seventh sets of microsplints 149, 151 are separated from one another by a third padding layer 154, and the sixth and eighth sets of microsplints 150, 152 are separated from one another by a fourth padding layer 155.

As shown in the profile end view, the first and second sections 125A, 125B of the main body 124 are generally arcuate shaped. Similarly, channels 126, 127, 132, 134, 141, 142, 147, and 148 are generally arcuate shaped. Embodiments herein are not limited in this context, however.

The first section 125A of the main body 124 may further include a pair of passthrough channels 156A, 156B. Fibers from the first set of SCFs 128, and the first and third sets of microsplints 135, 137 pass into/through passthrough channel 156B. Fibers from the second set of SCFs 130, and the second and fourth sets of microsplints 136, 139 pass into/through passthrough channel 156A. Similarly, the second section 125B of the main body 124 may include a second pair of passthrough channels 157A, 157B. Fibers from the third set of SCFs 143, and the fifth and seventh sets of microsplints 149, 151 pass into/through passthrough channel 157A. Fibers from the fourth set of SCFs 144, and the sixth and eighth sets of microsplints 150, 152 pass into/through passthrough channel 157B.

Figure 4:
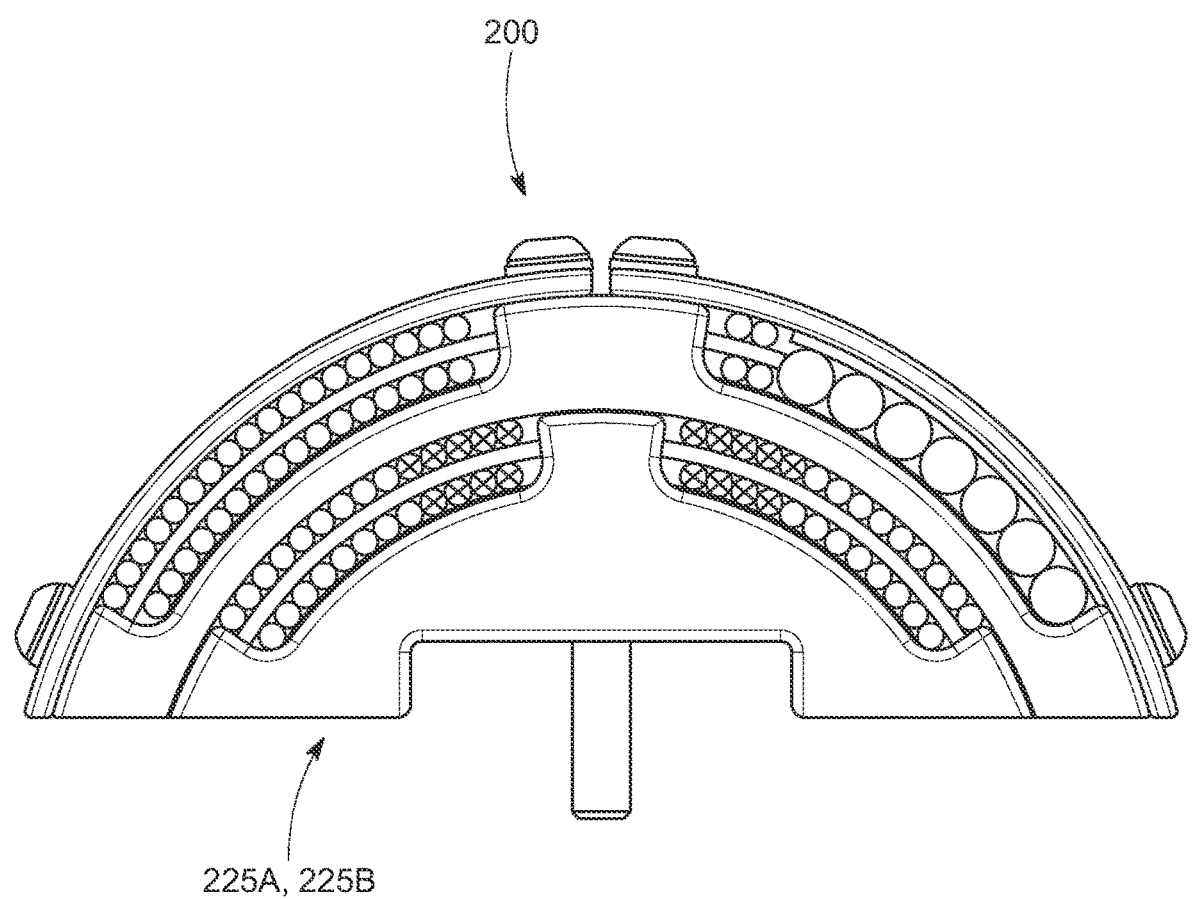
FIG. 4 demonstrates one section of an example assembly, according to embodiments of the present disclosure.

FIG. 4 demonstrates one section (e.g., 225A or 225B) of an example assembly 200 in greater detail. The assembly 200 may be the same or similar in many aspects to the assembly 100 described above, and the section 225A, 225B may be the same or similar to the first and second sections 125A, 125B described above. As such, only certain aspects of the assembly 200 will hereinafter be described for the sake of brevity. Again, the assembly 200 demonstrates a non-limiting two-layer microsplint arrangement. For an MJ-T type joint, in which 1.3 mm microsplints are used, up to 51 microsplints per quadrant may be present, with 204 microsplints in total. For an MJ-S type joint, up to 21 microsplints, 7 SCFs per quadrant, 84 microsplints, and 28 SCFs may be present. It will be appreciated that different joint types (e.g., AFL or STI+) may have different microsplint sizes and therefore a different number of microsplints.

Figure 5:
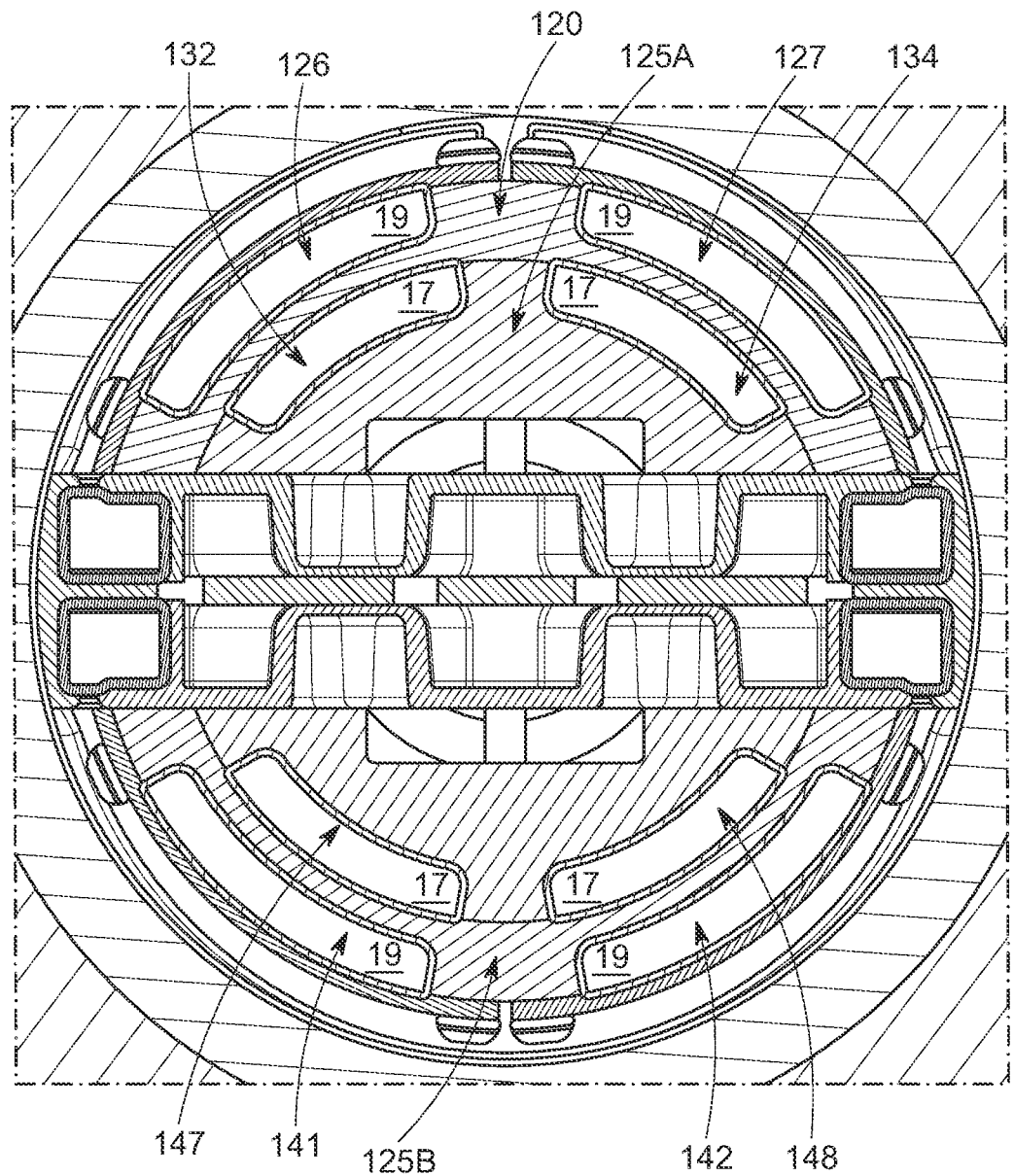
FIG. 5 demonstrates another possible optical cable arrangement using the assembly of the present disclosure.

FIG. 5 demonstrates another possible optical cable arrangement using the retainer 120 of the present disclosure. For MJ-T, 144 splice storage is required. In this example, 72 microsplints may extend through each of the first section 125A and the second section 125B. In some embodiments, each of the 144 microsplints may be 16 mm microsplints, wherein the first channel 126 and the second channel 127 may each receive 19 microsplints, and the third channel 132 and the fourth channel 134 may each receive 17 microsplints. Similarly, the fifth channel 141 and the sixth channel 142 may each receive 19 microsplints, and seventh channel 147 and the eighth channel 148 may each receive 17 microsplints.

Figure 6:
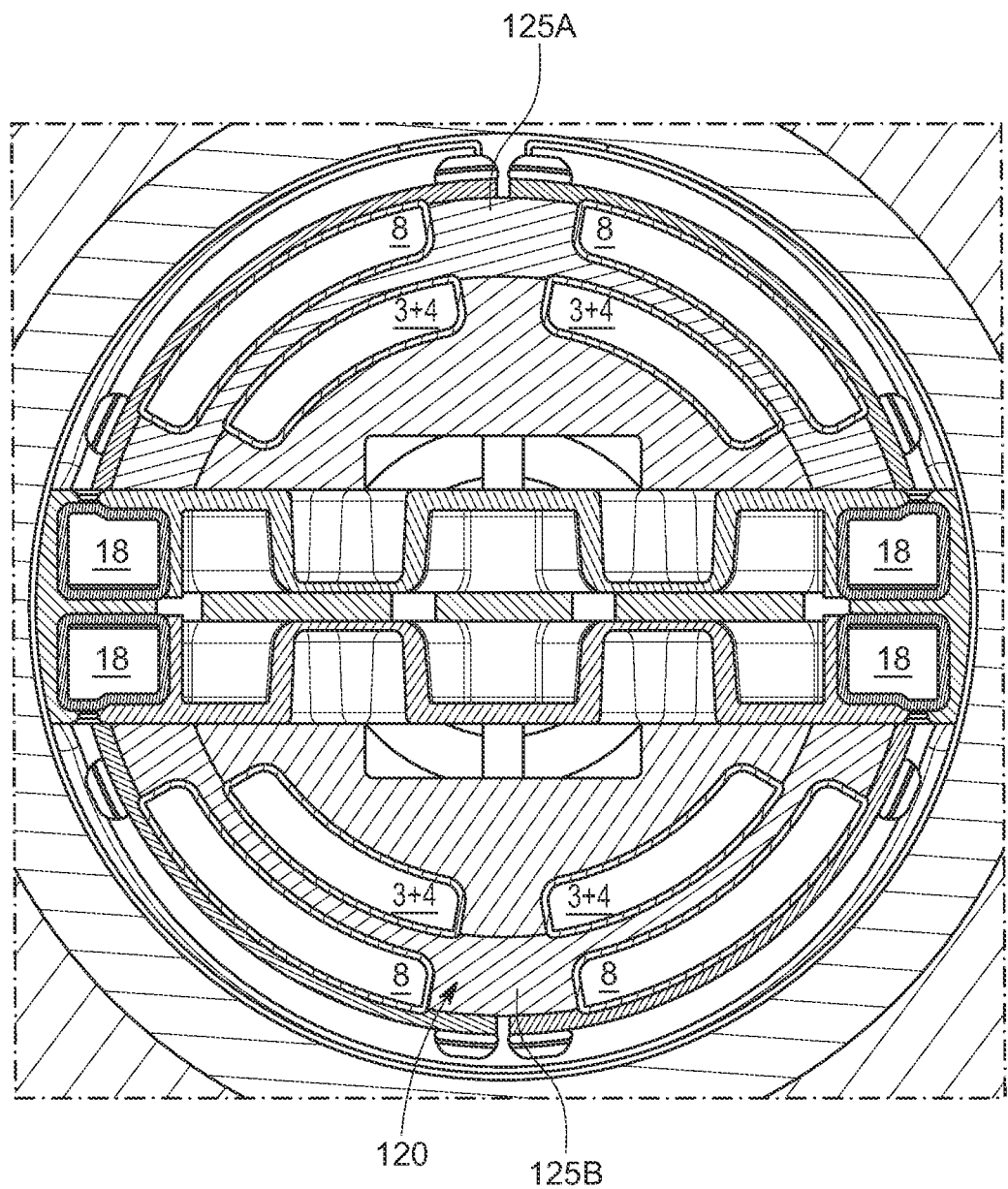
FIG. 6 demonstrates another possible optical cable arrangement using the assembly of the present disclosure.

FIG. 6 demonstrates another possible optical cable arrangement using the retainer 120 of the present disclosure. The retainer 120 may be the same or similar as those described above. For MJ-S, 48 SCFs and 96 splice storage is required. In this example, 24 SCFs and 44 microsplints for each of the first section 125A and the second section 125B may be present.

Figure 7:
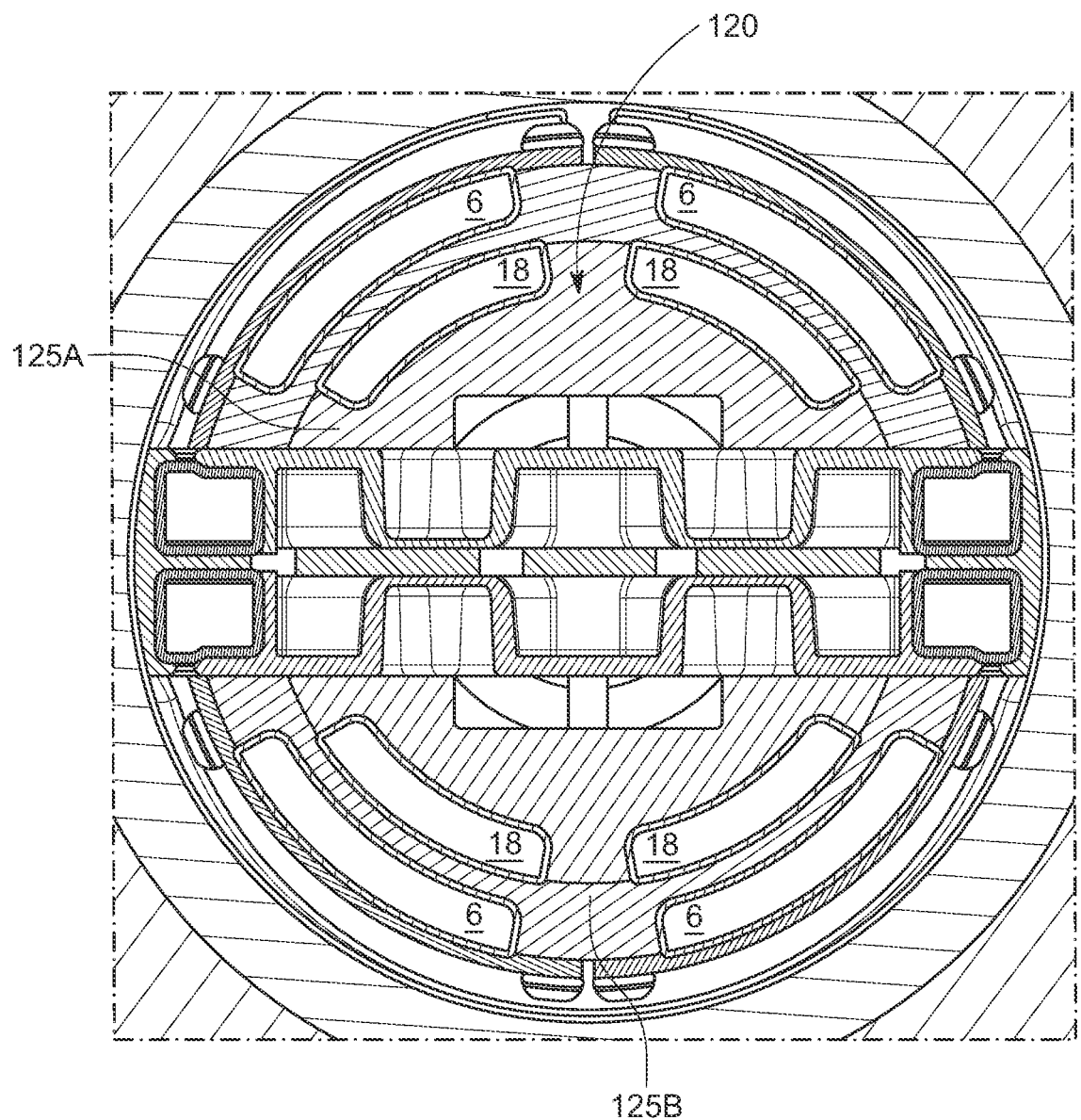
FIG. 7 demonstrates another possible optical cable arrangement using the assembly of the present disclosure.

FIG. 7 demonstrates another possible optical cable arrangement using the retainer 120 of the present disclosure. The retainer 120 may be the same or similar as those described above. In this MJ-S cascaded arrangement, 24 SCFs and 72 splice storage is required. As shown in the fiber tray (i.e., retainer) cross section, 12 SCFs and 36 microsplints per side may be present.

Figure 8:
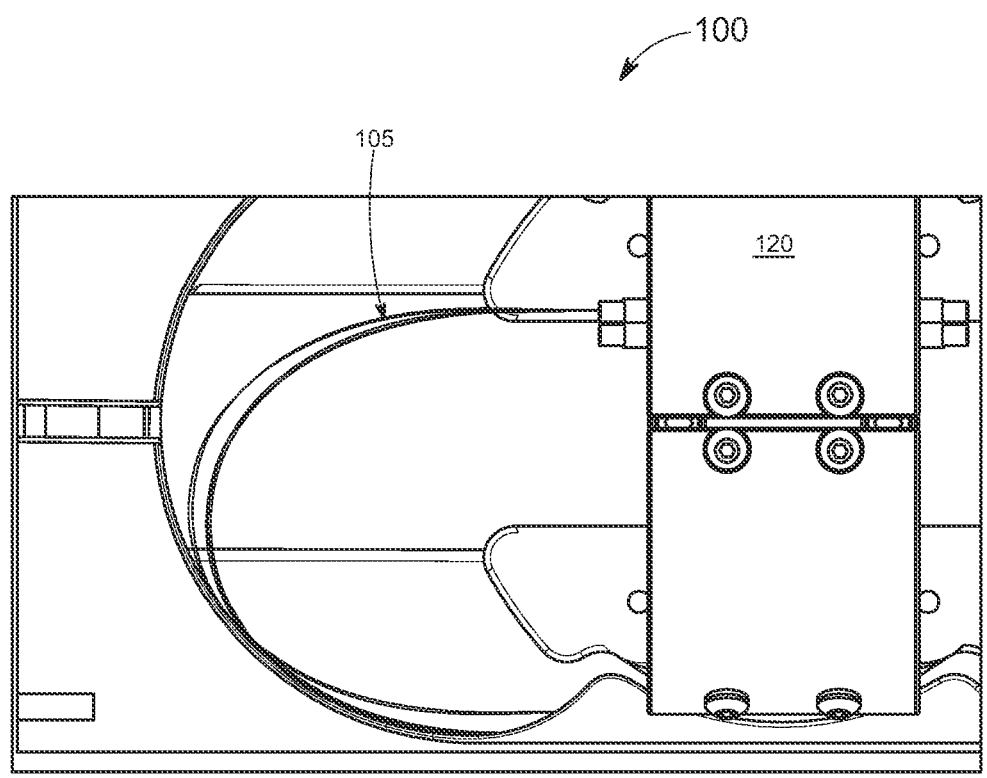
FIGS. 8-9 demonstrate fiber bend radius improvements using the assembly 100 according to embodiments of the present disclosure.
Figure 9:
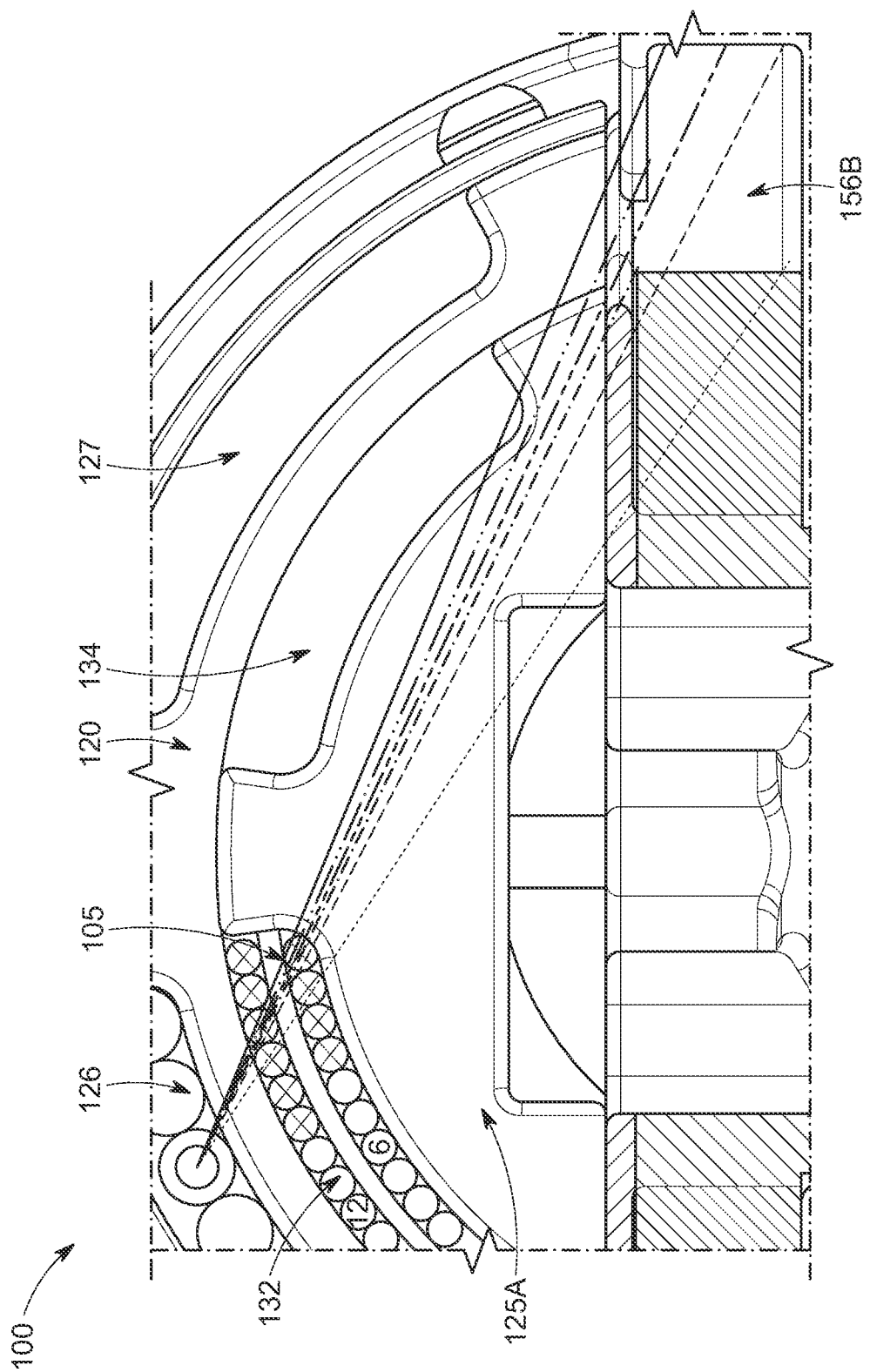

FIGS. 8-9 demonstrate bend radius improvements to a group of fibers 105 using the assembly 100 according to embodiments of the present disclosure. In this example, a single SCF and two microsplints are selected for demonstration. As shown, the fibers 105 may extend between the first channel 126 and the passthrough channel 156B. Although not shown, additional fibers may extend through the second channel 127, the third channel 132, and the fourth channel 134

Figure 10:
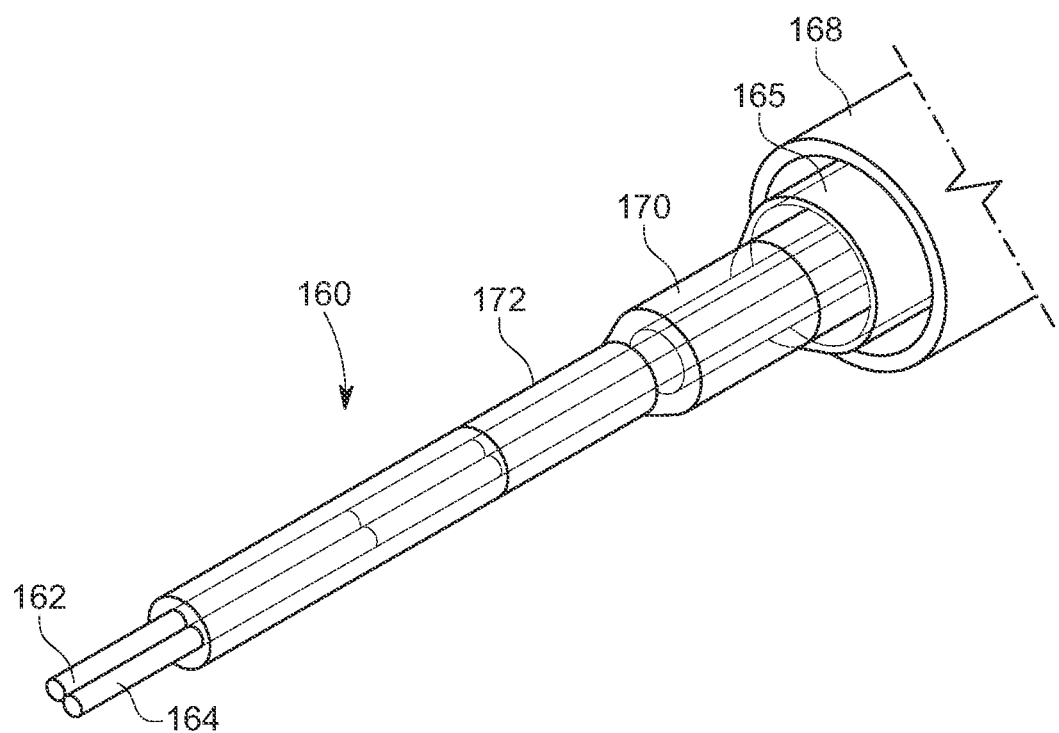
FIGS. 10-11 demonstrate a dual SCF fiber arrangement, according to the embodiments of the present disclosure.
Figure 11:
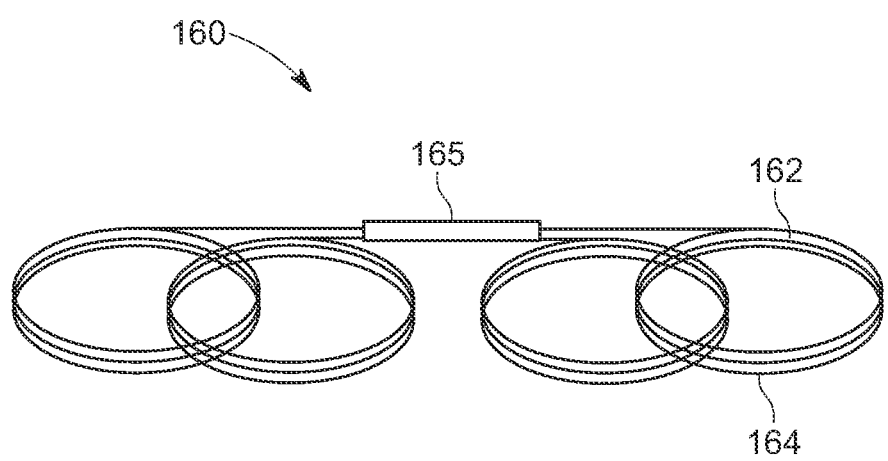

FIGS. 10-11 demonstrate a dual SCF fiber arrangement 160, which is possible according to the embodiments of the present disclosure. As shown, two SCF tails 162, 164 are contained within a same/single metallic housing 165. In other embodiments, more than two SCF tails may be present. The dual SCF fiber arrangement 160 may further include an outer heat shrinkable wrap/label 168 surrounding the metallic housing 165, an SST layer 170 within the metallic housing 165, and an ethyl vinyl adhesive 172 within the SST layer 170. It will be appreciated that the dual SCF fiber arrangement 160 described herein may be coupled to an undersea device, such as a cable joint, branching unit, or repeater, with one or more isolated bypass conductive paths being provided across the undersea device. It may be further appreciated that the dual SCF fiber arrangement 160 may correspond to one or more of the first set of SCFs 128 described herein. At least one conductor may be terminated within a housing of the undersea device and at least one conductor may be coupled to a conductive bridge member that provides the isolated bypass conductive path across the device. Multiple conductor optical cables may be coupled to undersea devices in optical networks using independent power paths, for example, to deliver power to different powered components at different voltage potentials.

For the sake of convenience and clarity, terms such as "top," "bottom," "upper," "lower," "vertical," "horizontal," "lateral," and "longitudinal" will be understood as describing the relative placement and orientation of components and their constituent parts as appearing in the figures. The terminology will include the words specifically mentioned, derivatives thereof, and words of similar import.

As used herein, an element or operation recited in the singular and proceeded with the word "a" or "an" is to be understood as including plural elements or operations, until such exclusion is explicitly recited. Furthermore, references to "one embodiment" of the present disclosure are not intended as limiting. Additional embodiments may also incorporating the recited features.

Furthermore, the terms "substantial" or "substantially," as well as the terms "approximate" or "approximately," can be used interchangeably in some embodiments, and can be described using any relative measures acceptable by one of ordinary skill in the art. For example, these terms can serve as a comparison to a reference parameter, to indicate a deviation capable of providing the intended function. Although non-limiting, the deviation from the reference parameter can be, for example, in an amount of less than 1%, less than 3%, less than 5%, less than 10%, less than 15%, less than 20%, and so on.

Still furthermore, one of ordinary skill will understand when an element such as a layer, region, or substrate is referred to as being formed on, deposited on, or disposed "on," "over" or "atop" another element, the element can be directly on the other element or intervening elements may also be present. In contrast, when an element is referred to as being "directly on," "directly over" or "directly atop" another element, no intervening elements are present.

While certain embodiments of the disclosure have been described herein, the disclosure is not limited thereto, as the disclosure is as broad in scope as the art will allow and the specification may be read likewise. Therefore, the above description is not to be construed as limiting. Instead, the above description includes exemplifications of particular embodiments. Those skilled in the art will envision other modifications within the scope and spirit of the claims appended hereto.

What is claimed is:

1. An undersea optical cable connection assembly, comprising:
    a plurality of shape compensation filters (SCF) and a plurality of microsplints;
    a retainer operable to arrange the plurality of SCFs and the plurality of microsplints, the retainer comprising:
        a main body including a first section and a second section;
        a first channel and a second channel extending through the first section of the main body, wherein a first set of SCFs of the plurality of SCFs extend through the first channel, and wherein a second set of SCFs of the plurality of SCFs extend through the second channel;
        a third channel and a fourth channel extending through the first section of the main body, wherein a first set of microsplints of the plurality of microsplints extends through the third channel, and wherein a second set of microsplints of the plurality of microsplints extends through the fourth channel;
        a third set of microsplints of the plurality of microsplints extending through the third channel, wherein the first and third sets of microsplints are separated from one another by a first padding layer; and
        a fifth channel and a sixth channel extending through the second section of the main body, wherein a third set of SCFs of the plurality of SCFs extends through the fifth channel, and wherein a fourth set of SCFs of the plurality of SCFs extend through the sixth channel.

2. The undersea optical cable connection assembly of claim 1, further comprising a fourth set of microsplints of the plurality of microsplints extending through the fourth channel, wherein the second and fourth sets of microsplints are separated from one another by a second padding layer.

3. The undersea optical cable connection assembly of claim 1, further comprising:
    a seventh channel and an eighth channel extending through the second section of the main body, wherein a fifth set of microsplints of the plurality of microsplints extends through the seventh channel, and wherein a sixth set of microsplints of the plurality of microsplints extends through the eighth channel; and
    a seventh set of microsplints extending through the seventh channel, wherein the fifth and seventh sets of microsplints are separated from one another by a third padding layer.

4. The undersea optical cable connection assembly of claim 3, wherein each of the first and second sections of the main body further comprises a first passthrough channel and a second passthrough channel.

5. The undersea optical cable connection assembly of claim 4, wherein the first set of SCFs of the plurality of SCFs and the first set of microsplints of the plurality of microsplints further extend through the second passthrough channel of the first section, and wherein the second set of SCFs of the plurality of SCFs and the second set of microsplints of the plurality of microsplints further extend through the first passthrough channel of the first section.

6. The undersea optical cable connection assembly of claim 4, wherein the third set of SCFs of the plurality of SCFs and the fifth set of microsplints of the plurality of microsplints further extend through the second passthrough channel of the second section, and wherein the fourth set of SCFs of the plurality of SCFs and the sixth set of microsplints of the plurality of microsplints further extend through the first passthrough channel of the second section.

7. The undersea optical cable connection assembly of claim 1, wherein each of the first channel, the second channel, the third channel, and the fourth channel have an arcuate profile.

8. The undersea optical cable connection assembly of claim 1, wherein the third set of microsplints of the plurality of microsplints is positioned radially farther from a center of the main body than the first set of microsplints of the plurality of microsplints.

9. The undersea optical cable connection assembly of claim 1, further comprising:
    a pressure housing surrounding the retainer; and
    an insulation layer surrounding the pressure housing.

10. The undersea optical cable connection assembly of claim 1, wherein at least one of the plurality of SCFs comprises a plurality of fibers within a single metallic housing.

11. A submarine cable joint, comprising:
    a retainer operable to arrange a plurality of shape compensation filters (SCFs) and a plurality of microsplints, the retainer comprising:
        a main body including a first section and a second section, wherein the first and second sections are located on opposites sides of a central axis;
        a first channel and a second channel extending through the first section of the main body, wherein a first set of SCFs of the plurality of SCFs extend through the first channel, and wherein a second set of SCFs of the plurality of SCFs extend through the second channel;
        a third channel and a fourth channel extending through the first section of the main body, wherein a first set of microsplints of the plurality of microsplints extends through the third channel, and wherein a second set of microsplints of the plurality of microsplints extends through the fourth channel; and
        a third set of microsplints of the plurality of microsplints extending through the third channel, wherein the first and third sets of microsplints are separated from one another by a first padding layer;
        a fifth channel and a sixth channel extending through the second section of the main body, wherein a third set of SCFs of the plurality of SCFs extends through the fifth channel, and wherein a fourth set of SCFs of the plurality of SCFs extend through the sixth channel.

12. The submarine cable joint of claim 11, further comprising a fourth set of microsplints of the plurality of microsplints extending through the fourth channel, wherein the second and fourth sets of microsplints are separated from one another by a second padding layer.

13. The submarine cable joint of claim 11, further comprising:
a seventh channel and an eighth channel extending through the second section of the main body, wherein a fifth set of microsplints of the plurality of microsplints extends through the seventh channel, and wherein a sixth set of microsplints of the plurality of microsplints extends through the eighth channel; and
a seventh set of microsplints extending through the seventh channel, wherein the fifth and seventh sets of microsplints are separated from one another by a third padding layer.

14. The submarine cable joint of claim 13, wherein each of the first and second sections of the main body further comprises a first passthrough channel and a second passthrough channel.

15. The submarine cable joint of claim 14, wherein the first set of SCFs of the plurality of SCFs and the first set of microsplints of the plurality of microsplints further extend through the second passthrough channel of the first section, and wherein the second set of SCFs of the plurality of SCFs and the second set of microsplints of the plurality of microsplints further extend through the first passthrough channel of the first section.

16. The submarine cable joint of claim 14, wherein the third set of SCFs of the plurality of SCFs and the fifth set of microsplints of the plurality of microsplints further extend through the second passthrough channel of the second section, and wherein the fourth set of SCFs of the plurality of SCFs and the sixth set of microsplints of the plurality of microsplints further extend through the first passthrough channel of the second section.

17. The submarine cable joint of claim 11, wherein each of the first channel, the second channel, the third channel, and the fourth channel have an arcuate profile.

18. The submarine cable joint of claim 11, wherein the third set of microsplints of the plurality of microsplints is positioned radially farther from a center of the main body than the first set of microsplints of the plurality of microsplints.

19. A retainer operable to arrange a plurality of shape compensation filters (SCFs) and a plurality of microsplints, the retainer comprising:
a main body including a first section and a second section, wherein the first and second sections are located on opposites sides of a central axis;
a first channel and a second channel extending through the first section of the main body, wherein a first set of SCFs of the plurality of SCFs extend through the first channel, and wherein a second set of SCFs of the plurality of SCFs extend through the second channel;
a third channel and a fourth channel extending through the first section of the main body, wherein a first set of microsplints of the plurality of microsplints extends through the third channel, and wherein a second set of microsplints of the plurality of microsplints extends through the fourth channel;
a third set of microsplints of the plurality of microsplints extending through the third channel, wherein the first and third sets of microsplints are separated from one another by a first padding layer; and
a fifth channel and a sixth channel extending through the second section of the main body, wherein a third set of SCFs of the plurality of SCFs extends through the fifth channel, and wherein a fourth set of SCFs of the plurality of SCFs extend through the sixth channel.

20. The retainer of claim 19, further comprising a fourth set of microsplints of the plurality of microsplints extending through the fourth channel, wherein the second and fourth sets of microsplints are separated from one another by a second padding layer.

21. The retainer of claim 19, further comprising:
a seventh channel and an eighth channel extending through the second section of the main body, wherein a fifth set of microsplints of the plurality of microsplints extends through the seventh channel, and wherein a sixth set of microsplints of the plurality of microsplints extends through the eighth channel; and
a seventh set of microsplints extending through the seventh channel, wherein the fifth and seventh sets of microsplints are separated from one another by a third padding layer.

* * * * *